United States Patent

Brodd et al.

[11] Patent Number: 5,303,238
[45] Date of Patent: Apr. 12, 1994

[54] NETWORK COMMUNICATIONS INTERMEDIATE INTERFACE

[75] Inventors: Jeffrey L. Brodd, Cary, N.C.; Joel D. Eikenhorst, Rochester, Minn.; Adel F. Fahmy, Cary, N.C.; Harvey G. Kiel, Rochester, Minn.; James H. Maher, Cary, N.C.

[73] Assignee: International Business Machines Corporation, Armonk, N.Y.

[21] Appl. No.: 626,131

[22] Filed: Dec. 11, 1990

[51] Int. Cl.$^5$ ............................................. H04J 3/24
[52] U.S. Cl. .................................. 370/94.1; 370/85.13
[58] Field of Search .................. 370/94.1, 60, 16, 54, 370/85.13, 85.14, 85.1, 85.2, 85.3

[56] References Cited

U.S. PATENT DOCUMENTS

| | | | |
|---|---|---|---|
| 4,677,588 | 6/1987 | Benjamin et al. | 364/900 |
| 4,706,081 | 11/1987 | Hart et al. | 370/85.13 |
| 4,825,206 | 4/1989 | Brice, Jr. | 340/825.02 |
| 4,884,263 | 11/1989 | Suzuki | 370/60 |
| 4,914,571 | 4/1990 | Baratz et al. | 364/200 |
| 4,926,414 | 5/1990 | Baratz et al. | 370/31 |
| 4,972,437 | 11/1990 | Citron et al. | 370/85.4 |
| 5,021,949 | 6/1991 | Morten et al. | 370/60 |
| 5,136,580 | 8/1992 | Videlock et al. | 370/94.1 |
| 5,179,554 | 1/1993 | Lomioka et al. | 370/85.13 |
| 5,181,199 | 1/1993 | Motoki et al. | 370/94.1 |
| 5,189,695 | 2/1993 | Mazi | 370/94.1 |

Primary Examiner—Douglas W. Olms
Assistant Examiner—Shick Hom
Attorney, Agent, or Firm—Kenneth C. Hill; Andrew J. Dillon

[57] ABSTRACT

A highly efficient and cost effective system, which may be physically located locally to a group of workstations, performs communications rerouting at the network session level. The intermediate system changes data packet headers as necessary to make such rerouting transparent to the devices which are connected to it. Data packets are otherwise unaltered. The intermediate system can be used to connect to a plurality of workstations and to a network in such a manner that each workstation appears to be directly connected to the network.

23 Claims, 6 Drawing Sheets

NETWORK COMMUNICATIONS INTERMEDIATE INTERFACE

BACKGROUND OF THE INVENTION

1. Field of the Invention

The present invention relates generally to computer network communications, and more specifically to a system for performing a routing function between devices attached to the network.

2. Description of the Prior Art

Computer system networks continue to increase in popularity. This is, in large part, because they allow applications and users running on many different systems to communicate with each other, providing data and resource sharing. Networks may be limited to a few desktop systems located in close physical proximity, or may include thousands of systems of all sizes connected into a worldwide network. In general, networks are flexible, so they can be adapted to suit the needs of the users.

One important type of network generally is a peer to peer network. With such a network topology each node of the network is considered to be equal with the others. Each node can act as an intermediate node in a communications session, routing sessions between other network nodes. This excepts terminal nodes, which are not required to transmit data between two separate, adjacent systems as part of a communications link between them. A communications session initiated by any node of the network is routed to the nearest node, which selects the routing to be used to the next node in a communications link. One example of such a powerful, flexible system is SYSTEM NETWORK ARCHITECTURE (SNA), a network architecture defined by International Business Machines Corporation, and used widely throughout the world.

In a typical network, local networks, or subarea networks, are often connected to the remainder of the network through a single, fully featured, network node. This network node must have full network capabilities, but terminal nodes, such as work stations, which are connected to it need not have such capability. Even if only a few low end work stations in a single physical location are connected to a wide area network, a system capable of supporting full network node functions must typically be placed locally to allow such network access.

The full network node must be a relatively powerful system capable of supporting a wide variety of network functions. For example, a SNA network node must be capable of acting as an intermediate node in a session between two nodes which may be connected through a large number of additional intermediate nodes. The network node maintains a route selection table for many of the logical units in the network, and has the capability to search for and determine the location of any node given its logical unit identifier. When a logical unit requests a session with another logical unit, a network node receiving such request must locate the target logical unit, in its route selection table or by searching for it, and establish communication sessions with both the logical unit making the request, and a companion session with another adjacent node. The other adjacent node may be the target logical unit, or it may be another intermediate node used to establish a link to the target logical unit.

Once the session has been set up between two logical units, the network node routes incoming data to the appropriate outgoing communications link. Various services are provided by the network node. These can include, for example, adaptive pacing of data, renegotiation of bind values, and similar services The numerous functions required of a network node are well documented, and well known to those skilled in the art.

The cost of providing a system capable of supporting full network node functions is high relative to low end workstations typically connected to the network as terminal nodes. Use of a dedicated network node for the purpose of simply attaching a small number of workstations to a network is often wasteful. However, it is often not possible to connect a small group of physically proximate workstations to a network node located elsewhere. The nearest network node may be physically located several hundred miles away and the cost of maintaining separate communications links to it from each workstation can be prohibitive.

It would be desirable to provide a system which can easily and inexpensively be used to attach workstations to a network. It would be further desirable if a relatively simple system already used to connect nonintelligent peripherals to a network can be modified to perform the desired functions. It would also be desirable for the connections made by such system to be transparent to both the low end workstations and the network, so that, to both the workstation and the network, it appears that a direct link has been made.

SUMMARY OF THE INVENTION

It is therefore an object of the present invention to provide a system and method for connecting computer systems, such as workstations, to a network.

It is a further object of the present invention to provide such a system and method which eliminates a requirement for directly connecting each workstation in a group of workstations to a fully capable network node.

It is another object of the present invention to provide such a system which is transparent to both the network and the workstations.

Therefore, according to the present invention, a highly efficient and cost effective intermediate system, which may be physically located locally to a group of workstations, performs communications rerouting at the network session level. The intermediate system changes data packet headers as necessary to make such rerouting transparent to the devices which are connected to it. Data packets are otherwise unaltered. The intermediate system can be used to connect to a plurality of workstations and to a network in such a manner that each workstation appears to be directly connected to the network.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
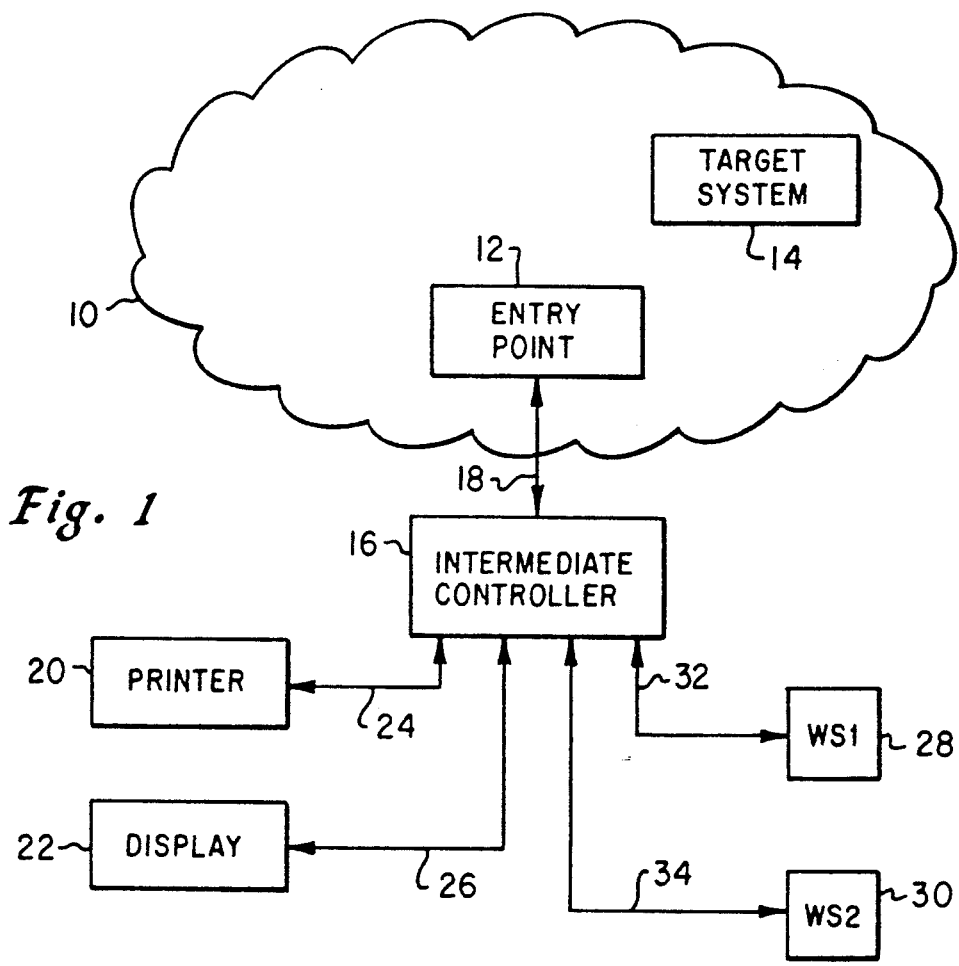
FIG. 1 is a block diagram of a portion of a computer system network according to the present invention.

Referring to FIG. 1, a high level block diagram is shown of a computer network 10. An entry point 12 allows systems to attach to the network. Entry point 12 can be any system allowing network access. It can be, for example, a fully configured network node supporting all rerouting and other functions required of such a node. Entry point 12 could also be a gateway system or an intermediate device such as a SNA subarea node.

Within the network 10, a target system node 14 can communicate with the entry point 12. The route is not shown in FIG. 1, and, as known in the art, may not be limited to a single connection. As is described below, the target system 14 is capable of communicating with devices and systems attached to the entry point 12.

An intermediate controller 16 is connected to entry point 12 by a single physical data link 18. Controller 16 is preferably an intelligent controller used to drive peripherals such as printer 20 and video display terminal 22, which are connected to the controller 16 by physical data links 24 and 26, respectively.

Workstations 28, 30 are also connected to controller 16 by data links 32, 34, respectively. Workstations 28, 30 are typically low cost workstations such as those provided by desktop personal computers. Workstations 28, 30 function only as terminal nodes of the network; they are not equipped to perform intermediate node routing functions and other network node functions. They are capable, however, of communicating with the target system 14 and other network 10 nodes (not shown) utilizing standard network protocols.

As examples of systems suitable for use in various parts of FIG. 1, target system 14 is preferably an AS/400 system, available from International Business Machines Corporation, running SNA Advanced Peer-to-Peer Networking (APPN) network node functions. Intermediate controller 16 is preferably a 5394 remote workstation controller also available from IBM, as modified by the teachings of this invention. Printers 20 and displays 22 can be attached to the controller 16 as known in the art, using twin-axial, token ring, or other well known protocols. The intermediate controller 16 preferably communicates with the entry point 12 using SNA LU6.2 or a similar network protocol.

The workstations 28, 30 can be any of the numerous types of personal workstations available in the market, such as the PS/2 workstations available from IBM. If target system 12 is an AS/400 system, the workstations 28, 30 are preferably running AS/400 PC Support applications. Although four devices are shown connected to the controller 16 in FIG. 1, this number may be more or less depending on system requirements and the capability of the controller 16. The workstations 28, 30 preferably communicate with the intermediate controller 16 using the same protocols as the printer 20 and display 22. Using such protocols, more than one device may be attached to a single physical port on the intermediate controller 16. However, each device is uniquely addressable by the intermediate controller 16.

The functions performed by intermediate controller 16 to support connection of the workstations 28, 30 to entry point 12 are relatively simple and straightforward to implement. In general terms, the intermediate controller 16 simply receives data packets, at the session level, from the workstations 28, 30 and forwards them to the data link 18. As described below, a session identifier contained in each packet may need to be converted within the intermediate controller 16, but the packet is otherwise unchanged. In a similar manner, data packets received from the entry point 12 over the data link 18 are examined to determine to which workstation 28, 30 they are directed. The intermediate controller 16 then performs session identifier translation, if necessary, and forwards the data packet to the appropriate data link 32 or 34. As before, the data packets are forwarded unchanged, with the exception of changing the session identifier when required.

Thus, the controller 16 performs a routing function between sessions running on the workstations 28, 30, and sessions running elsewhere on network 10. It appears to entry point 12 and workstations 28, 30 that they are directly connected by physical data links, with the intermediate controller 16 being completely transparent to communications between them. Since the rerouting functions performed by controller 16 are relatively simple, the code used to implement this function is very simple and very fast.

Figure 2A:
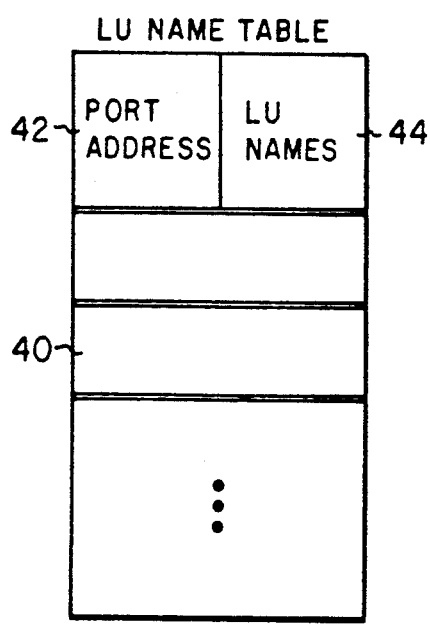
FIGS. 2(a)-(b) illustrate rerouting tables used by an intermediate controller according to the present invention.

FIG. 2 shows two translation tables maintained by the intermediate controller 16 in order to perform the routing functions. FIG. 2(a) illustrates an LU NAME TABLE 40. Each entry in the LU NAME TABLE 40 contains two fields. A PORT ADDRESS field 42 identifies the unique port address of the appropriate data link 32, 34. An LU NAMES field 44 contains all the logical unit names by which the workstation reached by that port address may be identified. These names are provided by the workstation when a connection is established with the intermediate controller 16.

When the connection is first made between a workstation 28 or 30 and the intermediate controller 16, the workstation sends a list of logical names to the controller 16. These are the logical names by which the workstation is known to the network. During the initial connection sequence, the intermediate controller 16 adds these logical names to the LU NAMES field 44 corresponding to the PORT ADDRESS 42 for that workstation.

Figure 2B:
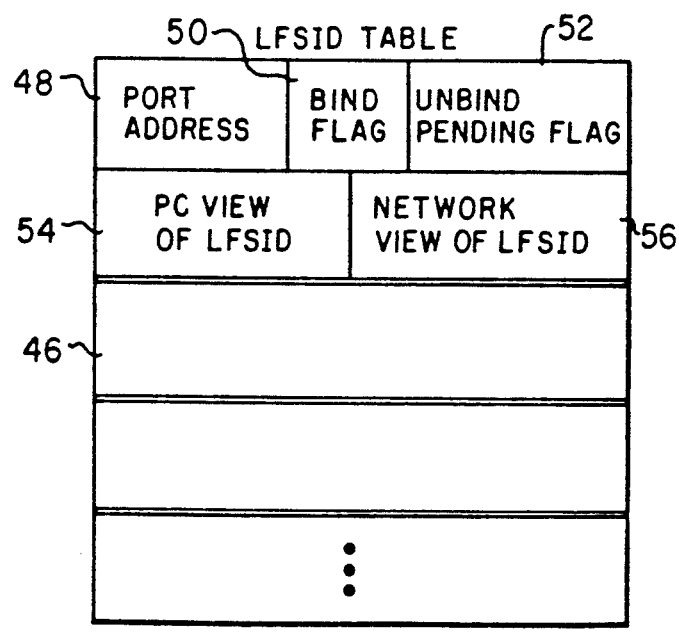

FIG. 2(b) shows an LFSID (local-form session identifier) TABLE 46. Each entry in the LFSID TABLE 46 in turn contains five fields. These include a PORT ADDRESS 48, a BIND FLAG 50, an UNBIND PENDING FLAG 52, a PC VIEW of the LFSID 54, and a NETWORK VIEW of the LFSID 56.

The PORT ADDRESS 48 identifies the port address corresponding to this entry just as does the PORT ADDRESS 42 in the LU NAME TABLE 40. A BIND FLAG 50 can be a single bit indicating whether the bind for the session to which the entry relates was received from the workstation attached to the intermediate controller 16, or from network target system 14. UNBIND PENDING FLAG 52 indicates that an UNBIND command has been transmitted by either a workstation or the target system 14 in order to terminate the session, but the session has not yet been completely terminated. As known in the art, BIND and UNBIND are the commands used to initiate and terminate session level connections using the SNA LU 6.2 protocol.

The PC VIEW of the LFSID 54 is a field containing the 16 bit session identifier used by the workstation to identify this session. As known in the art, the session identifier includes a bind sender bit flag as a 17th bit, which corresponds approximately to the BIND FLAG 50. The bind sender bit flag is not included in the PC VIEW field 54. The NETWORK VIEW of the LFSID is a 16 bit identifier used by the entry point 12 to identify this same session. As described below these entries 54, 56 are different in certain circumstances, necessitating translation of the session LFSID by the intermediate controller 16.

Each entry in the LU NAME TABLE 40 corresponds to a single workstation 28, 30 which is attached to the intermediate controller 16. Thus, the PORT ADDRESS field 42 for each entry will be unique. Each workstation 28, 30 may be seen by the network as one of several different LU NAMES, with each of these names being contained in the LU NAME field 44. Each workstation 28, 30 must have at least one LU NAME in order to be on the receiving end of a session initiated elsewhere in the network.

In the LFSID TABLE 46, each entry corresponds to a single SNA session level communications session between target system 14 and one of the workstations 28, 30. Each workstation can have multiple sessions simultaneously active with any node in the network 10. Since each session has a separate entry in the LFSID TABLE 46, the PORT ADDRESS field 48 will not necessarily be unique. For example, if workstation 28 is running four sessions with target system 14, four entries in the table 46 will contain the port address to which data link 32 is connected.

Whenever a new workstation is initially connected to the intermediate controller 16, a new entry will be added to the LU NAME TABLE 40 for that workstation. Whenever a workstation is disconnected from the controller 16, the associated entry will be deleted. Whenever a new communications session is initiated, whether by one of the workstations or by some network node connected directly or indirectly to the entry point 12, a new entry is added to LFSID TABLE 46. Whenever a session is closed, the corresponding entry is deleted The tables 40, 46 may be stored internally by the intermediate controller 16 in any convenient manner. For example, as known in the art, the tables can be stored as linked lists or indexed using hash tables.

Figures 3, 4:
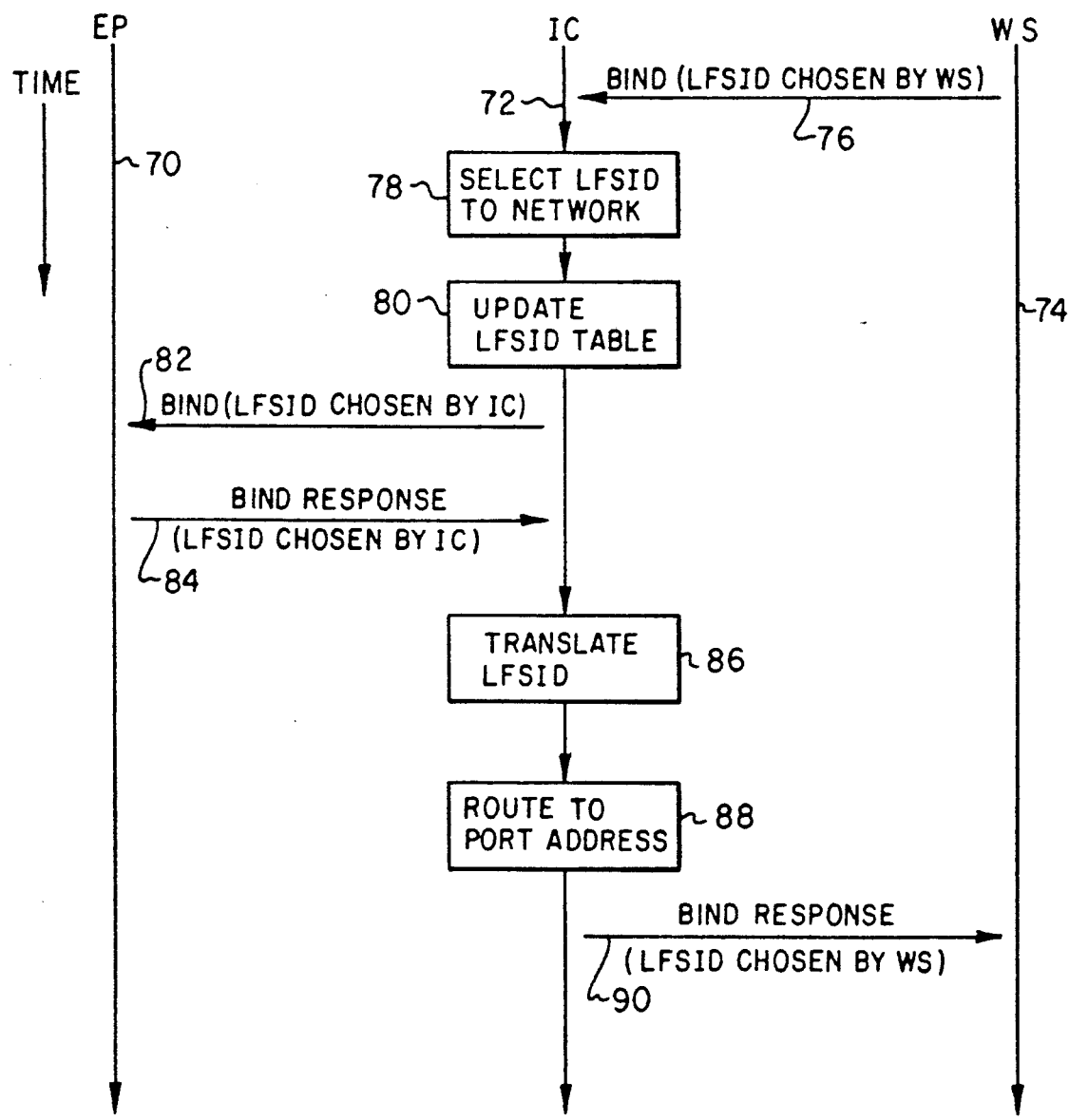
FIG. 3 is a data packet used for transmitting data between nodes in a network.
FIGS. 4-8 are combined flow charts and timing diagrams illustrating operation of the system and method of the present invention.

FIG. 3 shows a single session level packet 60. As known in the art, session level packets will not necessarily be the same as lower level packets transmitted and received by data link control layers of the SNA architecture. For purposes of illustrating the present invention, data packet 60 contains an LFSID field 62 and a PACKET TYPE field 64. LFSID field 62 is a 16 bit field which identifies which session this packet is a part of, plus a bind sender bit flag indicating who originated the bind. The PACKET TYPE field 64 indicates whether the packet 60 contains data, a BIND or UNBIND request, or other types of control information. Control field 66 contains all of the remaining information bits which form the header of packet 60. These can include a logical name for the intended target system when the packet is a BIND request. Data field 68 contains the actual applications data transmitted.

The controller 16 reads the PACKET TYPE field 64 to determine whether a packet transmitted by either the entry point 12 or one of the workstations 28, 30 is a BIND or UNBIND packet. If packet 60 is one of these types, the intermediate controller 16 will perform the actions described in FIG. 4–8. These actions can include changing the data contained in the LFSID field 62. Other packet types are treated as data, and are not changed with the possible exception of changing the LFSID field 62.

In FIGS. 4–8, operation of the intermediate controller 16 is shown in conjunction with data transmissions to and from entry point 12 and one of the workstations 28, 30. In these figures, time increases as one moves down the figure. Line 70 indicates events which happen in the entry point 12. Line 72 indicates events which occur within the interface controller 16, and line 74 stands for a single workstation. Event boxes on the intermediate controller line 72 can be read in the same manner as a flow chart, with control passing from one box to the next down the time line. Horizontal arrows between lines 70 and 72, or between lines 72 and 74, indicate the occurrence and direction of data flow between the corresponding devices.

FIG. 4 indicates the events which occur when a BIND request originates from the workstation. The BIND request is directed to some system in network 10, such as target system 14. A BIND request is sent 76 from the workstation to the intermediate 6 controller. As is known in the art, a unique session identifier, contained in the LFSID field 62, is used to identify this session for its duration. For each session initiated by a workstation, an LFSID is chosen which is unique to its communications over the associated data link 32 or 34.

It is typical for the workstation to pick as an LFSID number the next available integer in a sequence beginning at 0. Thus, for example, if sessions 0–3 are already active to the workstation, the next session to be initiated will be given LFSID number 4. Several workstations may be communicating through a single intermediate controller 16, so there may be several sessions numbered session 0, session 1, and so forth. Since all communications between the intermediate controller and the entry point 12 occur over a single physical link, simply using the LFSID numbers assigned by the workstations would not guarantee uniqueness of the session identifiers. Therefore, when a BIND originates from a workstation, the intermediate controller must select an available LFSID number 78 for its communications to the entry point 12. The intermediate controller then updates the LFSID table 80 by adding a new entry thereto. This entry includes the PORT ADDRESS of the workstation originating the BIND, and sets the BIND FLAG 50 to indicate that the BIND originated from the workstation. Since no UNBIND is currently pending for this session, the UNBIND PENDING FLAG is reset. The LFSID used by the workstation in the BIND command is placed into the PC VIEW of the LFSID field 54. The LFSID selected by the intermediate controller 16 to communicate with the network node 12 is placed into the NETWORK VIEW field 56. This completes the update of the LFSID TABLE 80.

The intermediate controller then sends the BIND command on to the entry point 82. The LFSID of the BIND packet is changed to the LFSID selected by the intermediate controller. The BIND request packet is otherwise unchanged.

After some period of time, a BIND RESPONSE packet 84 is returned to the intermediate controller. The BIND RESPONSE contains the LFSID previously selected by the intermediate controller and transmitted as part of the BIND request to the network node. The intermediate controller translates the LFSID 86, changing it back to the LFSID originally associated with the BIND by the workstation. The packet is otherwise unchanged, and is then routed to the port address 88 to which the workstation is connected. The BIND RESPONSE is then returned to the workstation.

At this point, a single session has been initiated between the workstation and the target system 14 through the entry point 12. The workstation believes that the session is identified with the number which it selected. The entry point believes that the session is identified with the number selected by the intermediate controller 16. Since the intermediate controller 16 translates between these two session identifiers in a transparent manner, neither the entry point 12 nor the workstation realize that such translation is taking place.

Figure 5:
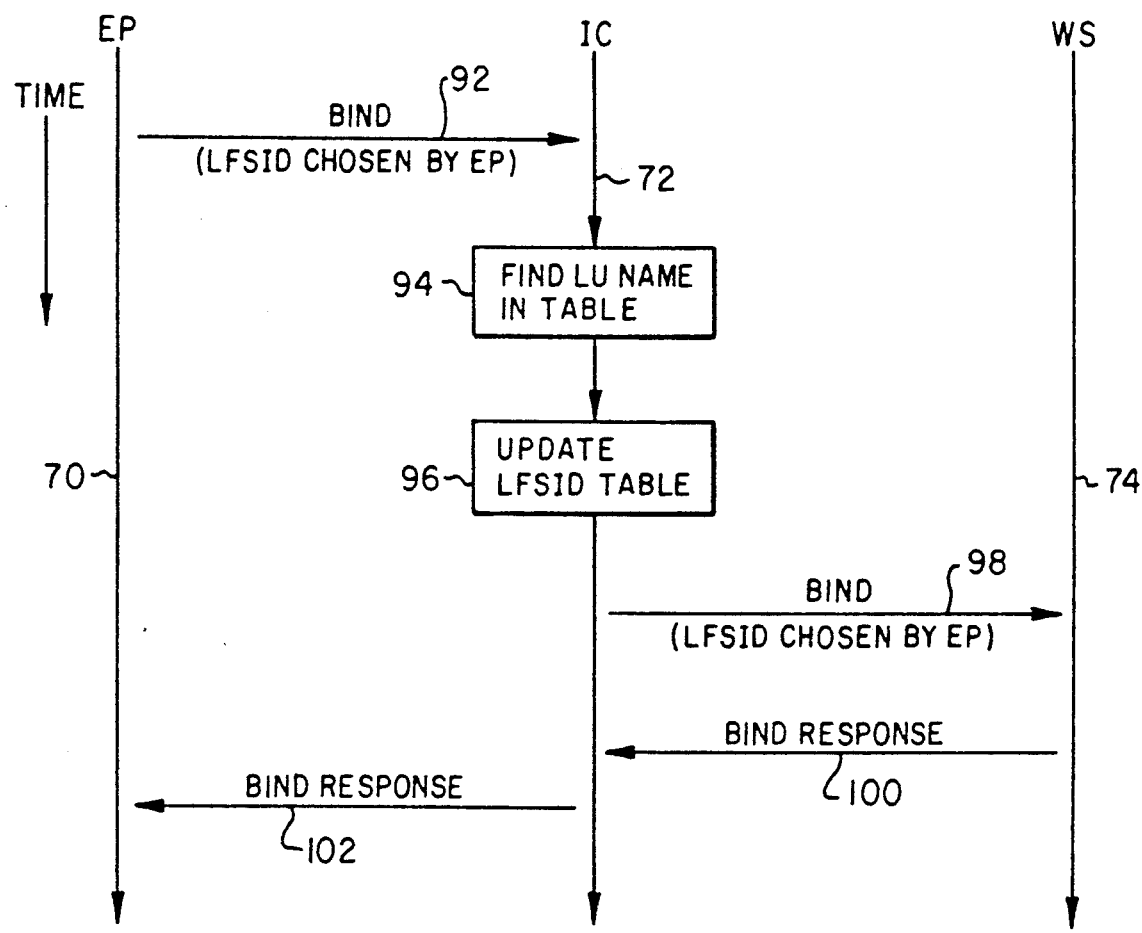

FIG. 5 is a similar diagram illustrating the events which occur when a new session is initiated by the target system 14. The BIND command is originally transmitted through the entry point 12 to the intermediate controller 92. It contains an LFSID chosen by the entry point 12. Since the entry point 12 is connected to the controller 16 over only a single data link 18, each of the session identifiers which it uses are guaranteed unique for that link.

As is known in the art, one field of a BIND data packet includes the logical unit name of the eventual receiving node. The controller 16 matches the logical unit name with one of the LU NAMES 44 found in the LU NAME TABLE 40. If there is no match, the controller generates a negative response (not shown) to be returned to the target system 14.

When the LU NAME is matched in the LU NAME TABLE 40, a new entry is generated in the LFSID table 46 which contains a PORT ADDRESS field 48 copied from the corresponding PORT ADDRESS field 42. The BIND FLAG 50 is reset to indicate that the BIND originated in the network, and the UNBIND PENDING flag is reset. The LFSID for this session is placed into the NETWORK VIEW field 56 and the PC VIEW field 54 is ignored. This completes the update of the LFSID table 96.

The BIND request is then forwarded on to the workstation 98. Note that, since the binds forwarded from the entry point 12 to the intermediate controller 16 are uniquely identified, the LFSID is not translated in this instance. After receiving the BIND request 98, the workstation returns a BIND RESPONSE 100. Since no LFSID translation is required, the BIND RESPONSE is simply forwarded on to the entry point 102 without change.

Figure 6:
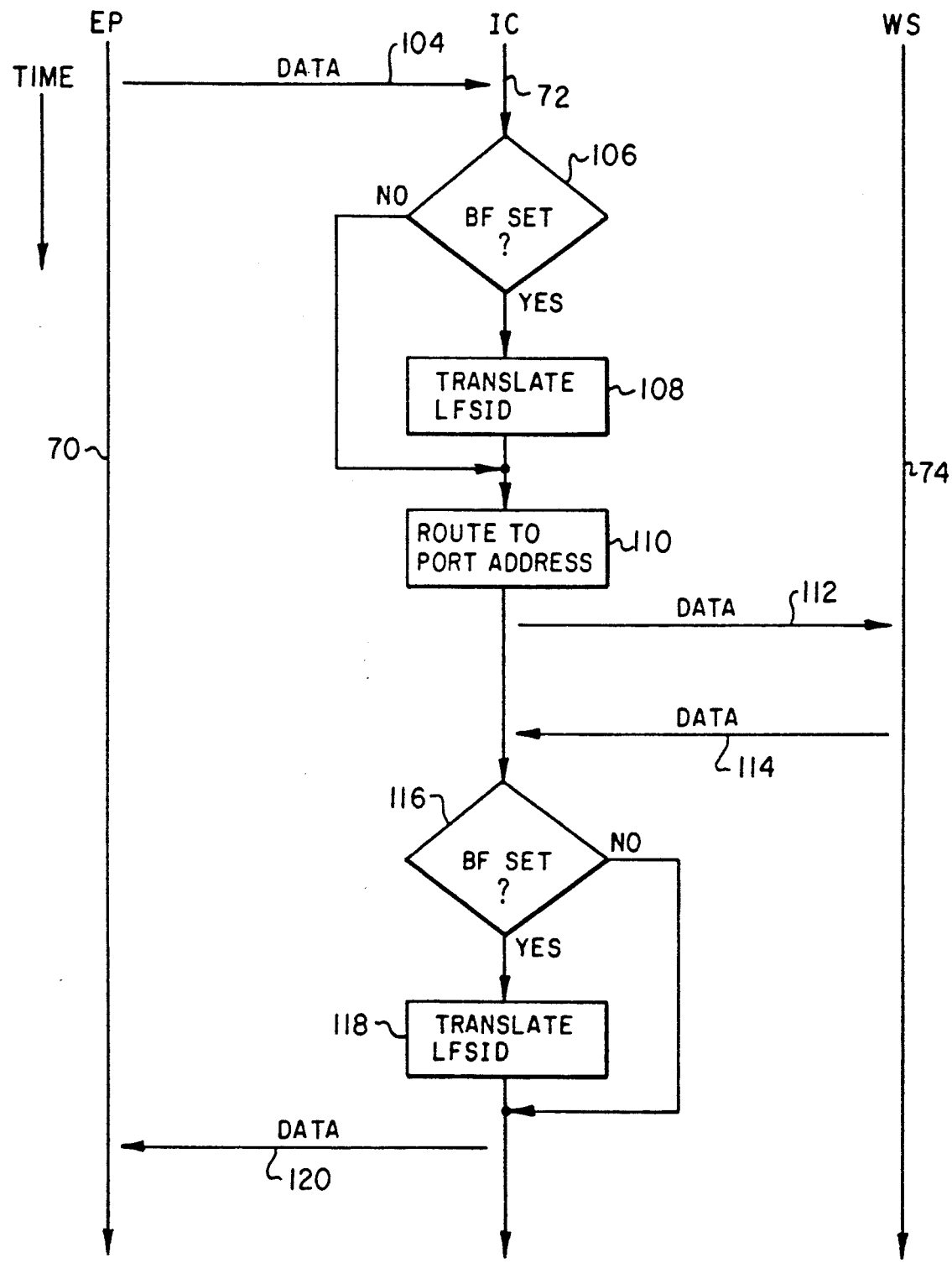

FIG. 6 illustrates the transmission of one data packet in each direction between the entry point 12 and the workstation. When the entry point 12 transmits a data packet, it is sent to the intermediate controller 104. The controller looks up the session identifier in the LFSID TABLE 46. If there is no match the data packet is simply ignored. Once a match is found, the controller examines the LFSID TABLE entry to see whether the BIND FLAG is set 106. If it is, indicating that the session was initiated by the workstation, the LFSID is translated as described above. In either case, the data packet is then routed to the correct port address 110, and sent to the workstation 112.

When data is transferred from the workstation to the entry point 12, it is sent to the intermediate controller 114 by the workstation. The controller finds the appropriate entry in the LFSID TABLE 46, and checks to see if the BIND FLAG is set 116. If not, no LFSID translation is necessary. If the BIND FLAG is set, the LFSID is translated 118. In either event, the data packet is then transmitted to the entry point 120.

It will be appreciated that the functions performed by the intermediate controller 16 for normal data packets are very simple. If the BIND FLAG is not set, indicating that the session originated from a node in the network such as target node 14, the data packet is simply sent on with no change. This is true regardless of the direction in which the data packet is being transmitted. If the BIND FLAG is set, a simple substitution of the LFSID is performed, and the data packet forwarded on. This introduces a minimal delay into data transmission. The intermediate controller 16 does not actually do anything with any of the data packets, it simply routes them appropriately.

Figure 7:
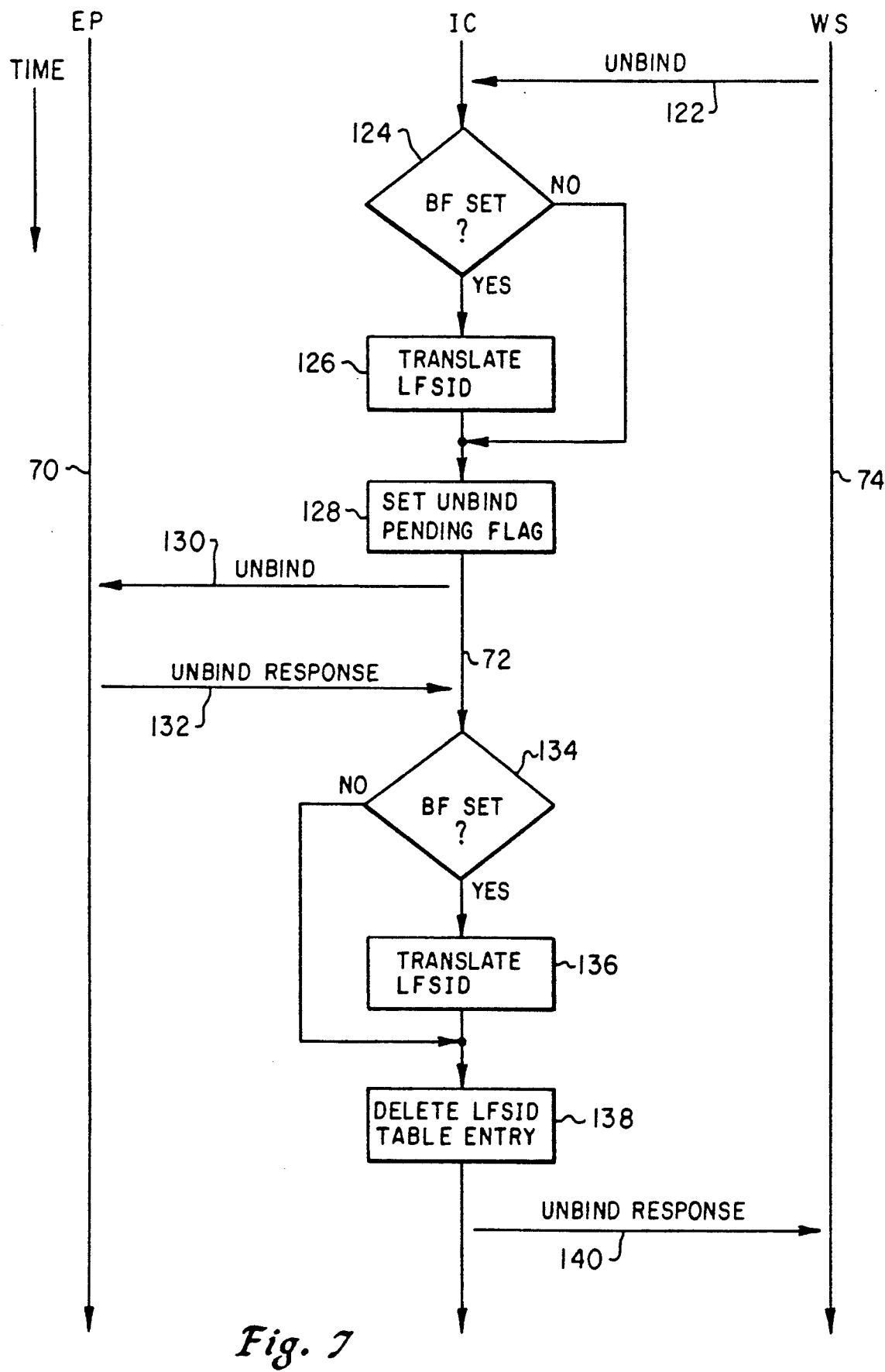

FIG. 7 illustrates the sequence of events which occur when an UNBIND request is sent by the workstation to the target system 14. The workstation can UNBIND, or close, the session regardless of which system originated it. The UNBIND is sent 122, and the session is located in the LFSID TABLE 46 by the intermediate controller 16. If the BIND FLAG is set 124, the LFSID is replaced 126 with the identifier expected by the network. Whether or not the BIND FLAG is set, the UNBIND PENDING FLAG is set 128, and the UNBIND request is forwarded to the entry point 130.

After some delay, an UNBIND RESPONSE 132 will be returned to the intermediate controller 16 through the entry point 12. If the BIND FLAG for that session is set, the LFSID is translated to that expected by the workstation as described above. In either event, the entry for that session is then deleted from the LFSID TABLE 138 and the UNBIND RESPONSE forwarded on to the workstation 140.

The purpose of setting the UNBIND pending flag in step 128 is to allow the session LFSID to be reused even if the UNBIND RESPONSE has not yet been received. Thus, when a BIND request is received, from either the entry point 12 or the workstation, for a session which still has an entry in the LFSID TABLE, but for which an UNBIND is pending, that entry will be replaced with new session information. Later UNBIND RESPONSES, rather than causing the entry to be deleted, will simply be ignored.

Figure 8:
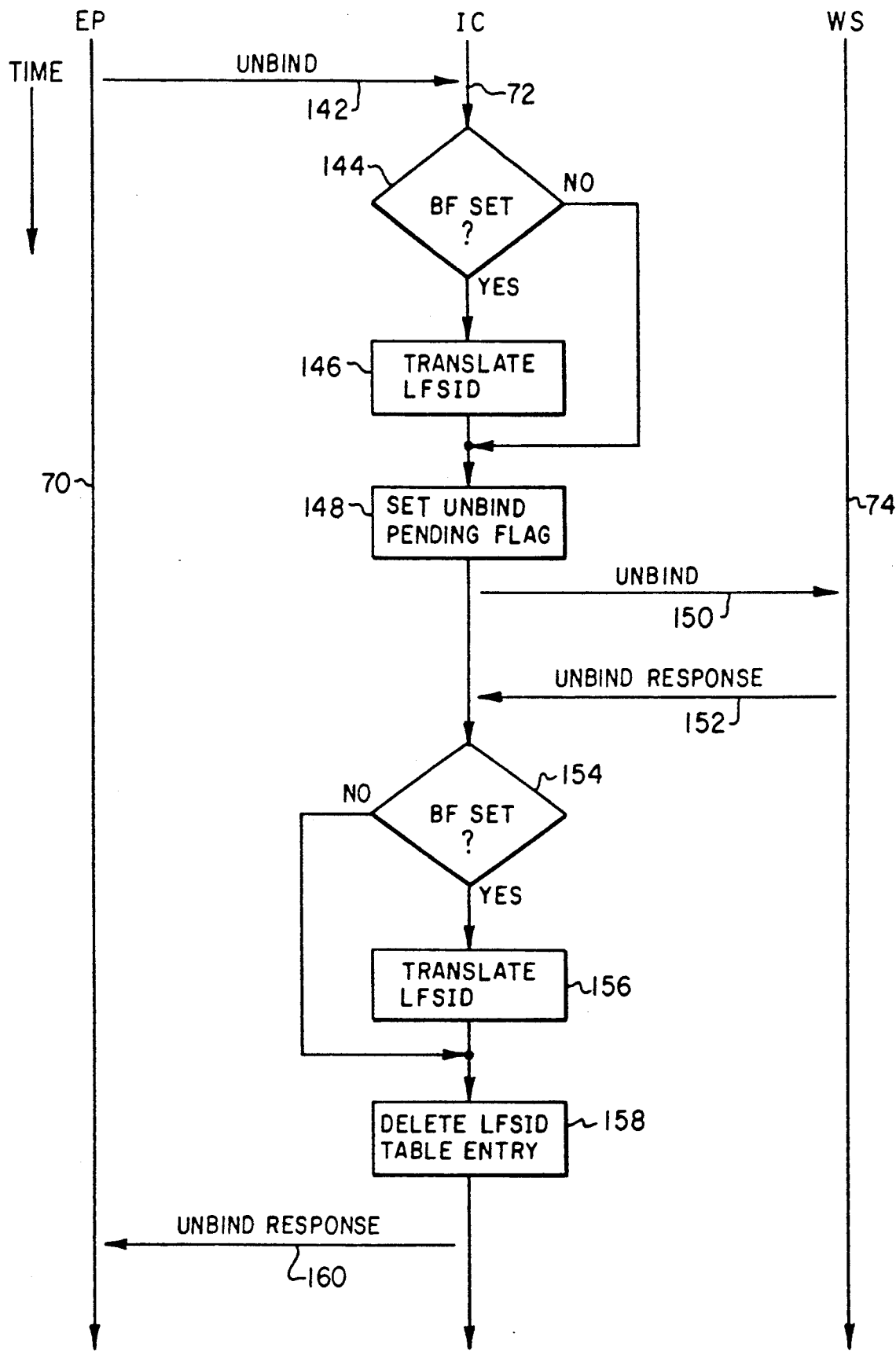

FIG. 8 illustrates the sequence of events which occur when an UNBIND is received from the target system 14 through the entry point 12. The UNBIND request is transmitted to the intermediate controller 142, and the session located in the LFSID TABLE 46. If the BIND FLAG is set 144, the LFSID is translated as 146 as described above. In either case, the UNBIND PENDING FLAG is set 148, and the UNBIND request is forwarded on to the workstation 150.

After the workstation has processed the UNBIND request, an UNBIND RESPONSE is returned to the intermediate controller 152. If the BIND FLAG for the corresponding entry is set 154, the LFSID is translated 156. In either case, the LFSID is deleted from the LFSID TABLE 158, and the UNBIND RESPONSE 160 returned to the target system 14 by forwarding it through the entry point 12.

As known in the art, various types of data and other packets can be interspersed in any order over a single data link. For each packet which is received by the intermediate controller, it must determine whether that packet is a BIND or UNBIND request or response. If the packet is one of these types the appropriate action must be taken with regards to the LFSID TABLE 46. The packets are then forwarded with the LFSID field changed if necessary. For all other types of data and control packets, the LFSID field is translated if necessary, and the packet is otherwise forwarded on unchanged.

If the connection to the workstation 28 or 30 goes down, the intermediate controller 16 will send UNBIND requests to the network entry point 12 for all active sessions with that workstation. If the link 18 goes down, the intermediate controller 16 sends UNBIND requests for all sessions of all attached workstations.

The technique described above provides for a number of end node workstations to be connected to a network entry point in a simple, straightforward manner. It is not necessary for each workstation to be individually connected to the entry point. This can represent a significant cost savings for systems in which the nearest entry point is physically located in a distant location, which could require either installation of a local network node with full network capabilities, or a plurality of direct communications links to the nearest entry point.

The functionality performed by the intermediate controller 16 to support communications as described above is simple and easily implemented. This allows the desired rerouting function to be implemented in a simple controller as described above. This also helps reduce overall cost of the system. In addition, since intermediate controllers such as the 5394 are in fairly common use to drive local printers and displays, in many installations no additional hardware will be required.

The functions performed by the intermediate controller 16 are quite different from those performed by systems which gateway communications between two networks. With the system described above, the intermediate controller 16 has only a single communications link to a single network. Several workstations can be attached to the network through the intermediate controller 16, so that it performs a port concentrator function for the workstations.

With the system described above, all of the workstations are routed through the intermediate controller instead of to it. This means that the several workstations attached to the intermediate controller cannot communicate directly with each other. Communication sessions between the workstations must be routed through the intermediate controller 16 to the entry point 12, and returned through the intermediate controller 16.

As an alternative embodiment, the intermediate controller 16 can be provided with a small amount of additional functionality in order to allow for local routing of sessions between workstations attached to the intermediate controller 16. The extra functions to be performed by the intermediate controller are as follows: When a BIND request is transmitted by a workstation connected to the intermediate controller, a check is made to see if the receiving logical unit name is contained in the LU NAME TABLE 40. If a match is found, the session is routed directly to the port address for the appropriate workstation. Two entries are placed in the LFSID TABLE 46, one for each workstation. When a packet is received from one workstation for a session with another workstation, the LFSID entry stored in the LFSID TABLE 46 will be found in another LFSID TABLE 46 entry. This means that the session should be routed directly out to the appropriate workstation, instead of to the entry point 12. Otherwise, function of the intermediate controller 16 is the same as described above.

While the invention has been particularly shown and described with reference to a preferred embodiment, it will be understood by those skilled in the art that various changes in form and detail may be made therein without departing from the spirit and scope of the invention.

What is claimed is:

1. A system for transferring data packets between a network entry point and a plurality of workstations, comprising:

a single input/output port connected to the network entry point;

a plurality of input/output ports each connected to one of the workstations, each input/output port having an input/output port address for uniquely identifying each of the connected workstations; and redirection means connected to all of the input/output ports for routing data packets received through the entry point input/output port to a workstation input/output port address corresponding to a session identified in a header of the packet, and for routing data packets received from a workstation input/output port address to the entry point input/output port;

wherein, for a session initiated through the entry point, such session is identified by both the entry point and the workstation with a single session identifier, and for a session initiated by a workstation, such session is identified by the entry point and the workstation with session identifiers which are different from each other;

and wherein, for any received data packet, if such packet belongs to a session which is identified by the entry point and the workstation with different identifiers, said redirection means further changes a session identifier in the packet header to the identifier used by the device connected to the input/output port to which the packet is routed.

2. The system of claim 1, wherein said redirection means includes a translation table, said translation table having one entry corresponding to each session routed through said redirection means, each entry having session identifiers used by the entry point and by a workstation to identify the corresponding session.

3. The system of claim 2, wherein said redirection means, for each received packet which initiates a session, adds a corresponding entry to said translation table.

4. The system of claim 3, wherein said redirection means, for each received packet which terminates a session, deletes the corresponding entry from said translation table.

5. The system of claim 1, wherein said redirection means includes a logical name table, wherein sessions initiated through the entry point by another system in the network are directed to a logical name, and wherein said redirection means selects an input/output port address corresponding to such logical name.

6. A system for communicating data packets between a target system and a plurality of workstations, each packet corresponding to a single communications session, comprising:

a network;

a target system connected to said network;

an entry point connected to said network;

a plurality of workstations;

an intermediate controller connected to said entry point by a single data link, and to each workstation by a data link, wherein each workstation is uniquely identified and separately addressable;

redirection means within said intermediate controller for routing data packets received through the entry point data link to a workstation data link corresponding to a session identified in a header of the packet, and for routing data packets received from a workstation data link to the entry point data link;

wherein, for a session initiated by the target system, such session is identified by both the entry point and the workstation with a single session identifier, and wherein, for a session initiated by a workstation, said redirection means identifies such session to the entry point and to the workstation with different session identifiers;

and further wherein, for any received data packet, if such packet belongs to a session which is identified by the entry point and the workstation with different identifiers, said redirection means changes a session identifier in the packet header to the identifier used by the device connected to the data link to which the packet is routed.

7. The system of claim 6, wherein said redirection means includes a translation table, said translation table having one entry corresponding to each session routed through said redirection means, each entry having session identifiers used by the entry point and by a workstation to identify the corresponding session.

8. The system of claim 7, wherein said redirection means, for each received packet which initiates a session, adds a corresponding entry to said translation table.

9. The system of claim 8, wherein said redirection means, for each received packet which terminates a session, deletes the corresponding entry from said translation table.

10. A method for transmitting packets corresponding to a communications session between a network entry point and a workstation, comprising the steps of:

sending packets from the entry point to an intermediate controller, such packets having a header including a session identifier;

sending packets from the workstation to the intermediate controller, such packets having a header including a session identifier;

within the intermediate controller, forwarding packets received from the entry point to the workstation;

within the intermediate controller, forwarding packets received from the workstation to the entry point;

within the intermediate controller, assigning session identifiers to sessions when the sessions are initiated, wherein a single session identifier is used for sessions initiated from the target system, and two different session identifiers are used for sessions initiated from the workstation, for packets received from the workstation, if the workstation and the entry point refer to the session using different identifiers, changing the identifier in the packet header to that used by the entry point before sending the packet, otherwise unchanged, to the entry point; and for packets received from the entry point, if the workstation and the entry point refer to the session using different identifiers, changing the identifier in the packet header to that used by the workstation before sending the packet, otherwise unchanged, to the workstation.

11. The method of claim 10, further comprising the steps of:

maintaining a table of session identifiers, wherein, for any session in which the entry point and the workstation use different identifiers for the session, both identifiers are stored in the table of session identifiers, wherein identifiers are changed to corresponding identifiers stored in the table of session identifiers.

12. The method of claim 11, wherein one entry is maintained in the table of session identifiers corresponding to each communications session transmitted through the intermediate controller, such entry containing the session identifiers for both the entry point and the workstation for those sessions in which they differ.

13. The method of claim 12, wherein an entry is added to the table of session identifiers whenever a new session is initiated.

14. The method of claim 12, wherein the entry corresponding to a communications session is deleted from the table of session identifiers when such session is terminated.

15. The method of claim 11, further comprising the step of:

maintaining a table of logical names for the workstations, wherein a request to initiate a session by the target system is denied unless a logical name identified in such request is matched to a logical name in the table of logical names.

16. The method of claim 15, further comprising the step of:

when a logical name identified in a request to initiate a session by the target node is found in the table of logical names, adding an entry to the table of session identifiers corresponding to such session.

17. A method for transmitting packets, corresponding to a communications session, between an input/output port connected to a network entry point and an input/output port connected to a workstation, comprising the steps of:

receiving packets from the entry point input/output port in an intermediate controller, such packets having a header including a session identifier;

receiving packets from the workstation input/output port in the intermediate controller, such packets having a header including a session identifier;

within the intermediate controller, forwarding packets received from the entry point input/output port to the workstation;

within the intermediate controller, forwarding packets received from the workstation input/output port to the entry point input/output port;

within the intermediate controller, assigning session identifiers to sessions when the sessions are initiated, wherein a single session identifier is used for sessions initiated from the target system, and two different session identifiers are used for sessions initiated from the workstation, for packets received from the workstation input/output port, if the session identifier is different from that used in packets received from the entry point input/output port for the same session, changing the identifier in the packet header to that used in such received packets before sending the packet, otherwise unchanged, to the entry point input/output port; and for packets received from the entry point input/output port, if the session identifier is different from that used in packets received from the workstation input/output port for the same session, changing the identifier in the packet header to that used in such receiving packets before sending the packet, otherwise unchanged, to the workstation input/output port.

18. The method of claim 17, further comprising the steps of:

maintaining a table of session identifiers, wherein, for any session in which the packets received from the entry point input/output port and the workstation input/output port use different identifiers for the session, both identifiers are stored in the table of session identifiers, wherein identifiers are changed to corresponding identifiers stored in the table of session identifiers.

19. The method of claim 18, wherein one entry is maintained in the table of session identifiers corresponding to each communications session transmitted through the intermediate controller, such entry containing the identifiers contained in packets received from both the entry point input/output port and the workstation input/output port for those sessions in which they differ.

20. The method of claim 19, wherein an entry is added to the table of session identifiers whenever a new session is initiated.

21. The method of claim 19, wherein the entry corresponding to a communications session is deleted from the table of session identifiers when such session is terminated.

22. The method of claim 18, further comprising the step of:

maintaining a table of logical names for the workstation input/output port, wherein a request to initiate a session received from the entry point input/output port is denied unless a logical name identified in such request is matched to a logical name in the table of logical names.

23. The method of claim 22, further comprising the step of:

when a logical name is identified corresponding to a request to initiate a session through the entry point input/output port, adding an entry to the table of session identifiers corresponding to such session.

* * * * *